US010312693B2

(12) United States Patent
McMorrow et al.

(10) Patent No.: US 10,312,693 B2
(45) Date of Patent: Jun. 4, 2019

(54) POWER GENERATION SYSTEM THAT COUPLES A PHOTOVOLTAIC ARRAY TO A DC ENERGY STORAGE SOURCE

(71) Applicant: INVENTUS HOLDINGS, LLC, Juno Beach, FL (US)

(72) Inventors: Ryan K. McMorrow, Jupiter, FL (US); Jeffrey R. Burkett, Hobe Sound, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 168 days.

(21) Appl. No.: 15/669,039

(22) Filed: Aug. 4, 2017

(65) Prior Publication Data

US 2018/0076629 A1 Mar. 15, 2018

Related U.S. Application Data

(60) Provisional application No. 62/385,463, filed on Sep. 9, 2016.

(51) Int. Cl.
*H02J 7/35* (2006.01)
*H02J 3/38* (2006.01)

(52) U.S. Cl.
CPC .............. *H02J 3/385* (2013.01); *H02J 7/35* (2013.01); *Y02E 10/566* (2013.01); *Y02E 10/58* (2013.01)

(58) Field of Classification Search
CPC ........... H02J 3/385; H02J 7/35; Y02E 10/566; Y02E 10/58
See application file for complete search history.

(56) References Cited

U.S. PATENT DOCUMENTS

| 6,914,411 | B2 | 7/2005 | Couch et al. |
| 2014/0091628 | A1 | 4/2014 | Thompson |
| 2017/0093156 | A1 | 3/2017 | Ozbek et al. |

OTHER PUBLICATIONS

Solar Choice Staff: "AC vs DC battery storage explained (with Magellan Power)", Solar Choice (Oct. 27, 2015), https://www.solarchoice.net.au/blog/ac-vs-dc-solar-battery-storage-explained.
Locment, et al: "DC Load and Batteries Control Limitations for Photovoltaic Systems. Experimental Validation"; IEEE Transactions on Power Electronics, vol. 27, No. 9, Sep. 2012, pp. 4030-4038.

*Primary Examiner* — Robert L Deberadinis
(74) *Attorney, Agent, or Firm* — Tarolli, Sundheim, Covell & Tummino LLP

(57) ABSTRACT

A controller of a power generation system can control coupling of a photovoltaic (PV) array to an inverter coupled to a power grid. The controller can also monitor an output voltage of a DC energy storage source disconnectedly coupled to the inverter and monitor an output power of the inverter. The controller can also couple the PV array to the DC energy storage source and adjust an effective output voltage of the PV array based on the output voltage of the DC energy storage source to charge the DC energy storage source.

20 Claims, 7 Drawing Sheets

US 10,312,693 B2

POWER GENERATION SYSTEM THAT COUPLES A PHOTOVOLTAIC ARRAY TO A DC ENERGY STORAGE SOURCE

CROSS-REFERENCE TO RELATED APPLICATION

This application claims the benefit of priority to U.S. Provisional Application No. 62/385,463, filed on 9 Sep. 2016 the entirety of which is herein incorporated by reference.

TECHNICAL FIELD

This disclosure relates to a power generation system that couples a photovoltaic (PV) array to a DC energy storage source.

BACKGROUND

Photovoltaic (PV) power generation systems are power systems that employ a plurality of solar modules to convert sunlight into electricity. PV systems include multiple components, including photovoltaic modules, mechanical and electrical connections and mountings, and signal conditioners for regulating or modifying the electrical output. In some examples, several PV modules are connected in series to form a PV string, with multiple PV strings in a PV system then being combined in parallel to aggregate the current in a PV array. PV cells generate direct current (DC) power, with the level of DC power being dependent on solar irradiation and the level of DC voltage dependent on temperature. When alternating current (AC) power is desired, an inverter is used to convert the DC power into AC power, such as AC power suitable for transfer to a power grid.

PV power systems have a complex relationship between their operating environment and the maximum power they can produce. A Fill Factor (FF) is a parameter that characterizes a non-linear electrical behavior of a solar cell of the PV power system. The FF is defined as the ratio of the maximum power from the solar cell to the product of Open Circuit Voltage ($V_{OC}$) and Short-Circuit Current ($I_{SC}$). In tabulated data, the FF is employed to estimate the maximum power that a PV cell can provide with an optimal load under given conditions.

SUMMARY

One example relates to a controller of a power generation system that can control coupling of a photovoltaic (PV) array to an inverter coupled to a power grid. The controller can also monitor an output voltage of a DC energy storage source disconnectedly coupled to the inverter and monitor an output power of the inverter. The controller can also couple the PV array to the DC energy storage source and adjust an effective output voltage of the PV array based on the output voltage of the DC energy storage source to charge the DC energy storage source.

Another example relates to a power generation system that includes an inverter coupled to a power grid and a PV array disconnectedly coupled to the inverter. The power generation system also includes a DC energy storage source disconnectedly coupled to the inverter and the PV array. The power generation system further includes a controller that connects the PV array to the DC energy storage source in response to determining that an output power of the inverter meets a selectable grid limit that changes over time. The controller adjusts an effective output voltage of the PV array based on an open circuit voltage and a charging voltage of the DC energy storage source to charge the DC energy storage source.

Still another example relates to a method that includes detecting that an output of an inverter meets a selectable grid limit, wherein a photovoltaic (PV) array provides power to the inverter. The method can also include setting an effective output voltage of the PV array to match an open circuit voltage of a DC energy storage source. The method can further include electrically coupling, in response to the setting, the PV array to a DC energy storage source. The method can still further include adjusting the effective output voltage of the PV array based on the open circuit voltage and a charging voltage of the DC energy storage source to charge the DC energy storage source and provide power to a power grid concurrently.

DETAILED DESCRIPTION

The present disclosure is related to systems and methods for controlling the operation of a power generation system. The power generation system includes an inverter coupled to a power grid and a photovoltaic (PV) array disconnectedly coupled to the inverter. The power generation system also includes a direct current (DC) energy storage source (e.g., a battery or other DC energy storage source) disconnectedly coupled to the inverter and the PV array.

A controller of the power generation system electrically connects the PV array to the DC energy storage source in response to determining that an output power of the inverter meets a selectable grid limit. In such a situation, the controller adjusts an effective output voltage of the PV array based on open circuit voltage and a charging voltage of the DC energy storage source in a manner described herein. In this manner, the power generation system concurrently charges the DC energy storage source and provides power to the power grid. Moreover, by carefully adjusting the effective output voltage of the PV array, over charging of the DC energy storage source is prevented. Additionally, since the PV array is electrically connected to the DC energy storage source (directly), the power generation system avoids (obviates) the need for a separate inverter and/or DC-DC converter for charging of the DC energy storage source.

Figure 1:
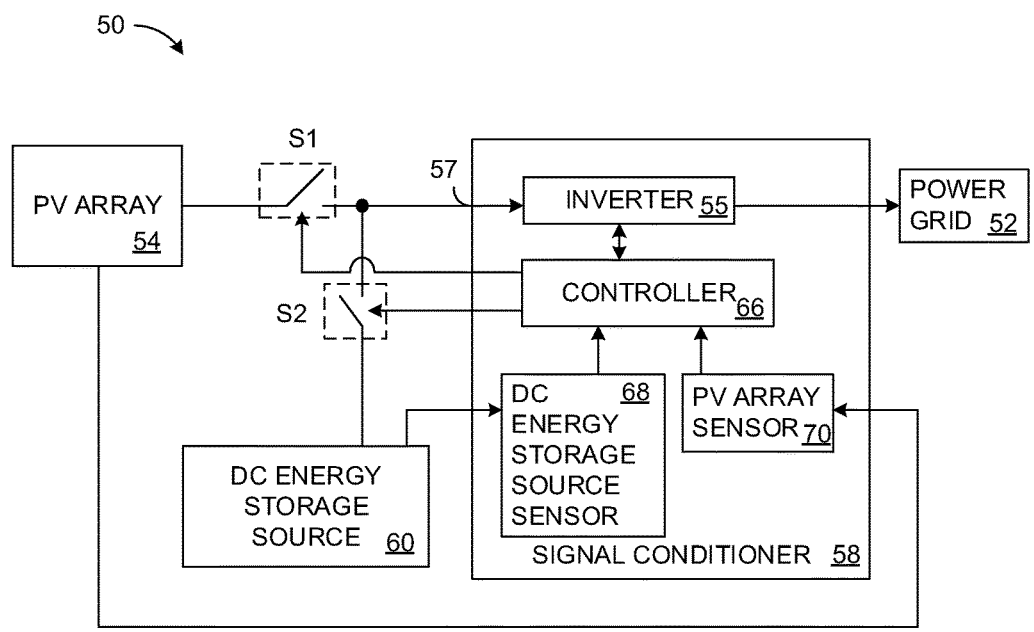
FIG. 1 illustrates an example of a power generation system.

FIG. 1 illustrates an example of a power generation system 50 that is configured to provide alternating current (AC) power (energy) to a power grid 52. The power generation system 50 includes a PV array 54. The PV array 54 is representative of multiple PV cells operating in concert. In particular, the PV array 54 may include any number of PV array groups, with each PV array group being configured to generate a DC power in response to solar irradiation. Each PV group includes one or more PV strings with each of the PV string including multiple PV cells (modules) coupled in series. It is appreciated that the number of PV groups and/or the number of PV strings can vary, with one, two, three, or four or more PV strings being included in each PV group, for example. Alternatively, the PV array 54 may be a single PV module.

The PV array 54 is disconnectedly coupled to an inverter 55 of a signal conditioner 58 via a first switch, S1 at an input 57 of the inverter 55. As used herein, the term "disconnectedly coupled" indicates that two nodes (e.g., the PV array 54 and the input 57) are intermittently electrically connected based on a status of a switch (e.g., the first switch S1). The power generation system 50 also includes a DC energy storage source 60 that is disconnectedly coupled to the input 57 of the inverter 55 via a second switch, S2. The DC energy storage source 60 could be representative of a single battery, multiple batteries coupled as a battery bank or an alternative form of a DC power source, such as but not limited to fly wheels and/or flow batteries. In some examples, the DC energy storage source 60 can be implemented as a lithium ion battery or an array of lithium ion batteries. As some other non-limiting examples, the DC energy storage source 60 could be formed of nickel metal hydride battery cells, nickel cadmium battery cells, lead-acid battery cells, or nearly any type of chemical battery.

The inverter 55 of the signal conditioner 58 converts DC signals into an AC signal for distribution on the power grid 52. The signal conditioner 58 includes a controller 66 that controls operations of the inverter 55 and/or other internal/external components, as discussed herein. In commercially available examples, the signal conditioner 58 may be referred to as the "inverter". Additionally, it is understood that in some examples, a subset (or all) of the constituent components of the signal conditioner 58 can be implemented on disparate (separate) components.

The PV array 54 is also coupled to a PV array sensory 70 of the signal conditioner 58. The PV array sensor 70 measures characteristics of a signal output by the PV array 54 (e.g., a voltage and current). The PV array 54 provides substantially real-time (e.g., within about 5 seconds) PV data characterizing the measured signal to the controller 66. Similarly, the DC energy storage source 60 is coupled to a DC energy storage sensor 68 that measures characteristics of the DC energy storage source 60 (e.g., voltage, current and impedance). The DC energy storage sensor 68 provides substantially real-time (e.g., within about 5 seconds) DC energy storage data to the controller 66 that characterizes the properties measured by the DC energy storage sensor 68.

The controller 66 controls an opening and closing of the first switch S1 and the second switch S2. The first switch S1 and the second switch S2 could be implemented as solid-state switches (e.g., transistors) or electromechanical switches (e.g., relays). Moreover, although the first switch, S1 and the second switch S2 are illustrated as being external to the signal conditioner 58, it is understood that in some examples, the first switch S1 and/or the second switch S2 could be internal to the signal conditioner 58.

The inverter 55 has a maximum power rating and/or a contracting limit that characterizes a maximum amount of power that the inverter 55 can deliver to the power grid 52, which maximum power can be referred to as a maximum inverter power. The PV array 54 also has a maximum power that is deliverable to the inverter 55, which maximum power is referred to as the maximum PV power. The maximum PV power is the highest power the PV array 54 outputs in ideal conditions (e.g., full irradiance, relatively low temperature, etc.). To ensure that the PV array 54 saturates the inverter 55 at less than ideal conditions, the maximum PV power is greater than the maximum inverter power. In fact, in some examples, the maximum PV power is 1.5 times (or more) than the maximum inverter power. Additionally, the controller 66 can set a "selectable grid limit" that defines a configurable maximum amount of power that the inverter 55 supplies to the power grid 52 at a given time. The selectable grid limit can change over time, for example, as power needs on the power grid 52 change. The selectable grid limit has a power level that is less than or equal to the maximum inverter power. For instance, in one example, the selectable grid limit may be set to about 90% of the maximum inverter power. It is noted that the selectable grid limit can be changed manually (e.g., by an end-user) and/or automatically. The changes can be based on changes to the environment of operation of the power generation system 50 and/or the power grid 52. Further, the changes to the selectable grid limit can be based on financial considerations, such as a changing amount of financial credit for power applied to the power grid 52. Moreover, the list of reasons/use cases for changing the selectable grid limit is not meant to be exhaustive. It is understood that the grid limit can be changed at nearly any time for nearly any reason without limitation to nearly any level at or below the maximum inverter power.

The controller 66 can be representative of a computing device (or multiple computing devices), such as a programmable logic controller (PLC), a microcontroller, etc. The controller 66 is configured/programmed to control the inverter 55 and the switches S1 and S2 to change operating modes of the power generation system 50 based on operational characteristics of the PV array 54 and the DC energy storage source 60.

In a first mode of operation (hereinafter, "the first mode"), the controller 66 is configured to close the first switch S1 and open the second switch S2. In the first mode, the PV array 54 applies a voltage and current to the input 57 of the inverter 55, and the PV array sensor 70 measures the voltage and current of the PV array 54. Additionally, in the first mode, the controller 66 receives PV data characterizing the voltage and current output by the PV array sensor 70. The controller 66 executes a Maximum Power Transfer Point Tracking (MPPT) procedure to set a Maximum Power Point (MPP) of the PV array 54. In particular, during the MPPT procedure, the controller 66 can command the inverter 55 to change an input impedance (or other electrical property) that changes an effective (observed) output voltage of the PV array 54 at the input 57. Moreover, the inverter 55 provides substantially real-time (e.g., within about 5 seconds) feedback to the controller 66 indicating the amount of current, voltage and/or power output to the power grid 52. Thus, in the first mode, the PV array 54 supplies power to the power grid 52 via the inverter 55.

During operation in the first mode, the controller 66 monitors the current, voltage and/or power output by the inverter 55 to determine a point at which the inverter 55 reaches (climbs to) the selectable grid limit. As one example, the power generation system 50 operates in the first mode from a time of sunrise until the inverter 55 reaches the selectable grid limit. Upon detecting that the inverter 55 reached the selectable grid limit, the controller 66 switches to a second mode of operation (hereinafter "the second mode").

In the second mode, the controller 66 evaluates the voltage of the DC energy storage source 60 to determine an open circuit voltage of the DC energy storage source 60. The controller 66 can set the effective output voltage of the PV array 54 to substantially match the open circuit voltage of the DC energy storage source 60. Upon setting the effective voltage, the controller 66 closes the first switch S1 and the second switch S2. Thus, in the second mode, the PV array 54 and the DC energy storage source 60 are electrically coupled to the same electrical node, namely, the input 57 of the inverter 55. Additionally, the controller 66 monitors the DC energy storage data provided from the DC energy storage sensor 68 to determine a charging voltage of the DC energy storage source 60.

Moreover, the controller 66 causes the inverter to set/adjust the effective output voltage of the PV array 54 to a level corresponding to the open circuit voltage of the DC energy storage source 60 plus the charging voltage. The charging voltage can vary based on the impedance and/or a desired charging current of the DC energy storage source 60, which level can be referred to as a power and charge voltage. The term "power and charge voltage" denotes an effective voltage level wherein the PV array 54 supplies DC power to the inverter 55 that is converted into AC power for the power grid 52 while concurrently charging the DC energy storage source 60. In a given example, (hereinafter, "the given example"), it is presumed that the controller 66 determines that if the PV array 54 has an effective output voltage of 1100 Volts (V) applied to the input 57 of the inverter 55, that the inverter 55 reaches the selectable grid limit. Additionally, in the given example, it is presumed that the DC energy storage source 60 has an open circuit voltage of about 900 V. Thus, in the given example, the controller 66 sets the effective output voltage of the PV array 54 to 900 V to substantially match the open circuit voltage of the DC energy storage source 60 and then closes the second switch, S2. Moreover, the controller 66 (relatively) slowly increases the effective output voltage of the PV array 54 from the open circuit voltage of the DC energy source and monitors a response output current in the DC energy storage source 60 until the desired charging current is reached. In the given example, it is presumed that the desired charging current is reached upon the effective output voltage of the PV array 54 being raised by about 10 V. Thus, in the given example, the controller 66 can set the power and charge voltage to about 910 V.

In the second mode, upon setting the power and charge voltage for the PV array 54, the PV array 54 supplies power to the power grid 52 (via the inverter 55) and charges the DC energy storage source 60 concurrently. This is possible in the second mode since the PV array 54 and the DC energy storage source 60 are coupled to a common node, namely the input 57 of the inverter 55. Additionally, setting the power and charge voltage to a level above the open circuit voltage of the DC energy storage source 60 causes the DC energy storage source 60 to "resist" the voltages above the open circuit voltage thereby absorbing the "excess" power, which charges the DC energy storage source 60. Continuing in the second mode, the controller 66 can adjust the power and charge voltage in response to detecting a change in the output of the DC energy storage source 60 (characterized in the DC energy storage data) and/or a change of output at the PV array (characterized in the PV data). In particular, in response to detecting an increase in the current of the DC energy storage source 60, the controller 66 can adjust the power and charge voltage at the inverter 55. Similarly, in response to a decrease in the current of the DC energy storage source 60, the controller 66 can adjust the power and charge voltage.

The controller 66 maintains the power generation system in the second mode until the DC energy storage source 60 is fully charged or the output power of the inverter 55 and/or the output voltage of the PV array 54 moves outside a threshold window. Alternatively, the controller 66 may detect that an effective voltage of the PV array 54 for charging the DC energy storage source 60 changes to a level that falls outside a voltage range that is allowable by the DC energy storage source 60 and/or the inverter 55. In any such situation, the controller 66 can switch the power generation system 50 to the first mode. Additionally or alternatively, the controller 66 can switch the power generation system 50 to the first mode in response to detecting a relatively steep decrease in a rate of power output by the inverter 55, which could indicate the presence of a temporary weather element (e.g., a cloud). In this situation, the controller 66 may switch to the first mode to avoid damaging the DC energy storage source 60. In yet other examples, the controller 66 can switch the power generation system 50 to the first mode in response to a command from another computing device and/or in response to user input. To switch the power generation system 50 back to the first mode, the controller 66 can be configured to open the second switch, S2. In response to the controller 66 detecting a PV output voltage that is favorable to charging of the DC energy storage source 60, the controller 66 can switch the power generation system 50 back to the second mode. This process of switching between the first mode and the second mode can be repeated multiple times throughout daylight hours. For example, weather conditions such as clouds, air temperature, rain, etc. may cause a drop in the output voltage of the PV array 54 that causes the controller 66 to temporarily switch the power generation system 50 to the first mode.

It is noted that the second mode, in some examples, the DC energy storage source 60 can discharge, such that the PV array 54 and the DC energy storage source 60 can concurrently provide output power to the inverter 55 that is converted to AC power for the power grid 52. For example, during operation in the second mode in some situations, the controller 66 can set the effective voltage of the PV array 54 to a level below the open circuit voltage of the DC energy storage source 60. In such a situation, the DC energy storage source 60 "resists" the drop in voltage by discharging DC power to the inverter 55.

Additionally, the controller 66 can be configured to switch the power generation system 50 to a third mode of operation (hereinafter, "the third mode") at predefined times and/or in response to a set of conditions that may vary based on an environment of operation (e.g., energy and/or financial considerations). Additionally or alternatively, the controller 66 may be configured to switch the power generation system 50 to the third mode in response to detecting a relatively gradual rate of decline in the output voltage of the PV array 54 and/or based on a time of day. As one example, the controller 66 switches to the third mode, for example, near sunset. In the third mode, the controller 66 is configured to open the first switch S1 and close the second switch S2. In the third mode, the DC energy storage source 60 supplies an input voltage to the input of the inverter 55, and the inverter 55 supplies AC power to the power grid 52. Accordingly, in the third mode, the DC energy storage source 60 discharges and supplies power to the power grid 52 via the inverter 60.

In the third mode, the controller 66 monitors the output voltage and current of the DC energy storage source 60 to determine if a minimum state of charge (SOC) of the DC energy storage source 60 is reached. In some examples, the minimum SOC is a level at which the DC energy storage source 60 has been nearly completely discharged/depleted. Upon reaching the minimum SOC, the controller 66 can switch the power generation system 50 to the first mode.

By employing the power generation system 50, the PV array 54 can directly charge the DC energy storage source 60 while power is supplied to the power grid 52. Such a direct charge obviates the need for a separate inverter and/or a DC/DC converter for charging the DC energy storage source 60. Rather, in the second mode, the voltage applied by the PV array 54 to the DC energy storage source 60 is (tightly) controlled by adjusting the effective output voltage of the PV array 54 at the input 57 of the inverter 55. Such a control prevents application of an excessively large voltage that might damage or reduce the lifetime of the DC energy storage source 60 due to over-charging. In this manner, at times during a day where the PV array 54 is capable of providing more power than the inverter 55 can convert to AC power for the power grid 52 (set by the selectable grid limit), the "excess" power can be employed to charge the DC energy storage source 60.

Figure 2:
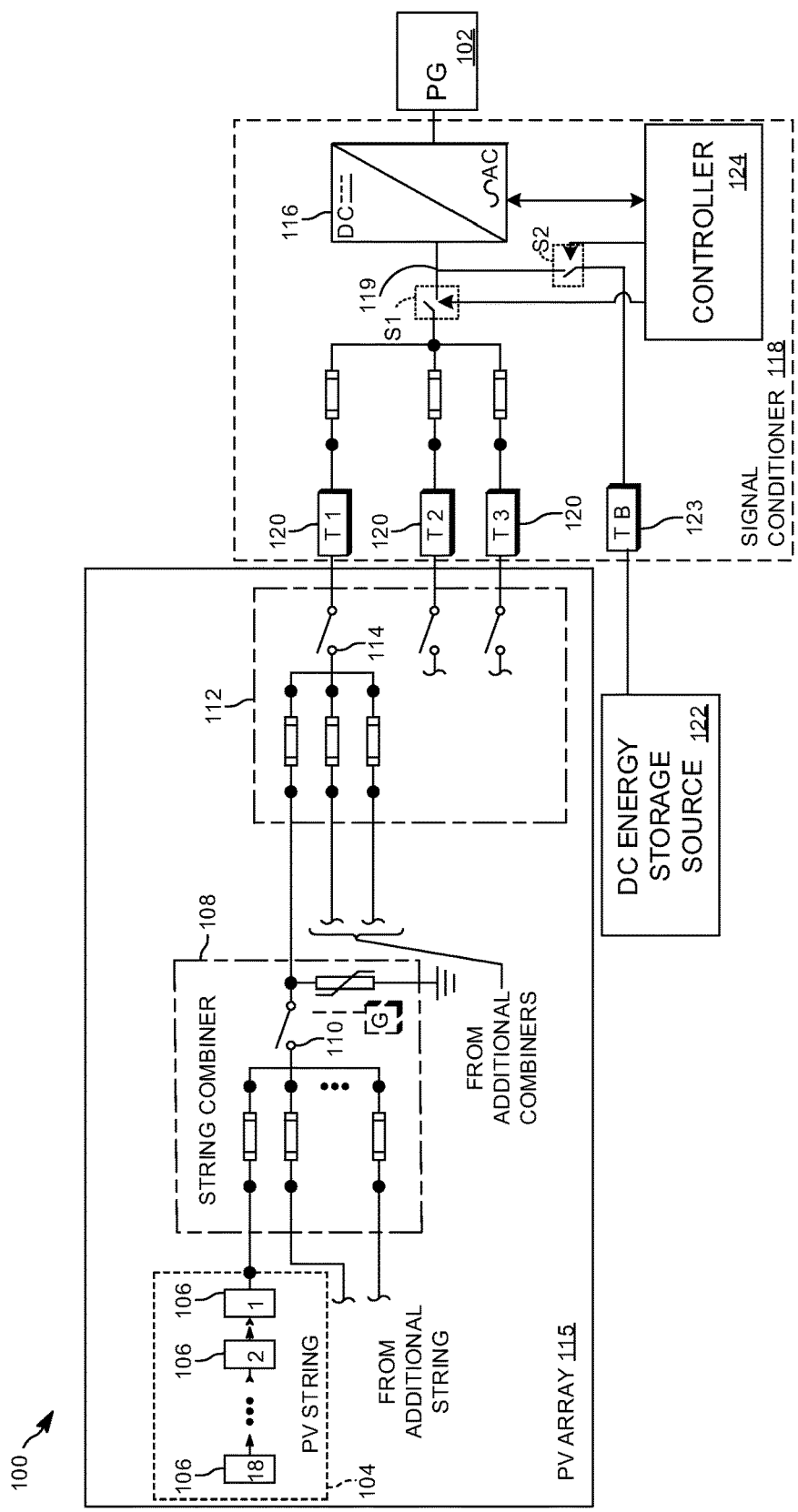
FIG. 2 illustrates another example of a power generation system.

FIG. 2 illustrates an example of an arrangement for a power generation system 100 to provide AC power to a power grid 102. It is noted that the arrangement in FIG. 2 is only one example of a possible arrangement, many similar or different arrangements are possible, as is appreciated by one of ordinary skill in the art. The power generation system 100 has B number of strings 104 of PV modules 106 connected in series, where B is an integer greater than or equal to one. In some examples, each of the B number of strings 104 can have the same number of PV modules 106 connected in series (e.g., 18). In this situation, each string 104 is configured to provide a maximum output of about 8 amperes (A) of current. In other examples, strings 104 can have different numbers of PV modules 106.

A set of strings 104 is coupled to an input of a string combiner 108. In some examples, three (3) strings 104 can be coupled to a common output node 110 of the string combiner 108. In other examples, there can be more or less strings 104 in the set of strings 104. Additionally, a set of string combiners 108 can be coupled to an input of a combiner box 112. In some examples, three (3) string combiners 108 are coupled to a common output node 114 of the combiner box 112. In other examples, more or less string combiners 108 can be in the set of string combiners 108. It is noted that the string combiners 108 and the combiner box 112 can collectively be referred to as a "combiner" in some examples. The strings 104, the string combiner 108 and the combiner box 112 (along with the constituent components) can be collectively be referred to as a PV array 115. The PV array 115 can be employed as one example to implement the PV array 54 of FIG. 1.

Each output of the combiner box 112 can be coupled to an inverter 116 of a signal conditioner 118 at an input 119. In the present example, it is presumed that there are R number of outputs of the combiner box 112, where R is an integer greater than or equal to one. The signal conditioner 118 can be employed for example, to implement the signal conditioner 58 of FIG. 1 (or some portion thereof). Additionally, R number of (current and voltage) transducers (T) 120 are coupled to the corresponding R number of outputs of the combiner box 112. Each transducer 120 can (passively) monitor a respective input signal provided to the inverter 116. Moreover, in some examples, each of the transducers 120 can be integrated with the inverter 116. In some examples, the set of transducers 120 can collectively be employed to implement the PV array sensor 70 of FIG. 1. Thus, the transducers 120 provide substantially real time data characterizing the output of the PV array 115, which can collectively be referred to as PV data.

Additionally, the power generation system 100 includes a DC energy storage source 122. The DC energy storage source 122 can be employed, for example to implement the DC energy storage source 60 of FIG. 1. The DC energy storage source 122 can represent a plurality of battery cells (or other DC source) coupled together to supply a voltage on the input 119 of the inverter 116. As one non-limiting example, the DC energy storage source 122 is formed of lithium ion battery cells. In other examples, the DC energy storage source 122 could be formed of nickel metal hydride battery cells, nickel cadmium battery cells, lead-acid battery cells, fly wheels, flow batteries, etc. A (current and voltage) transducer 123 monitors an input signal provided at the input 119 of the inverter 116. The transducer 123 can be employed to implement the DC energy storage sensor 68 of FIG. 1.

A first switch S1 is coupled between the input 119 and the output of the PV array 115. A second switch S2 is coupled between the DC energy storage source 122 and the input 119 of the inverter 116. A controller 124 of the signal conditioner 118 controls a state of the first switch, S1 and the second switch S2. In this manner, the PV array 115 and the DC energy storage source 122 are disconnectedly coupled to the input 119 of the inverter 116 and to each other. The controller 124 is implemented as a computing device (or multiple computing devices), such as a PLC or a microcontroller that executes machine-readable instructions. The controller 124 has a non-transitory machine-readable medium that stores the machine-readable instructions that (when executed) control operations of the power generation system 100.

The controller 124 receives signals from the current and voltage transducers 120 that (collectively) characterize PV data, which includes an output voltage and current of the PV array 115. Similarly, the controller 124 receives signals from the transducer 123 that characterizes DC energy storage data for the DC energy storage source 122. The DC energy storage data characterizes an output voltage, current and/or impedance of the DC energy storage source 122.

Similar to the power generation system 50 of FIG. 1, the power generation system 100 can operate in a first mode, wherein the first switch S1 is closed and the second switch S2 is opened. In the first mode, the controller 124 executes an MPPT (Maximum Power Point Tracking) procedure to identify and set the MPP of the PV array 115.

To execute the MPPT procedure, the controller 124 sets an effective output voltage of the PV array 115 at the inverter 116. In particular, to change the effective output voltage of the PV array 115, the controller 124 can change an input impedance of the inverter 116 at the input 119. Additionally, the controller 124 receives a feedback signal from the inverter 116 characterizing an input current to the input 119 and an output power of the inverter 116. It is understood that in other examples, more or less data may be provided in the feedback to the controller 124. The controller 124 adjusts (increases and decreases) the effective output voltage of the PV array 115 until the MPP (Maximum Power Point) is determined. Additionally, the MPP changes over time, and the MPPT procedure updates periodically (e.g., about every 10 minutes) and/or asynchronously (e.g., in response to a drop in output power) to determine an updated MPP.

Figure 3:
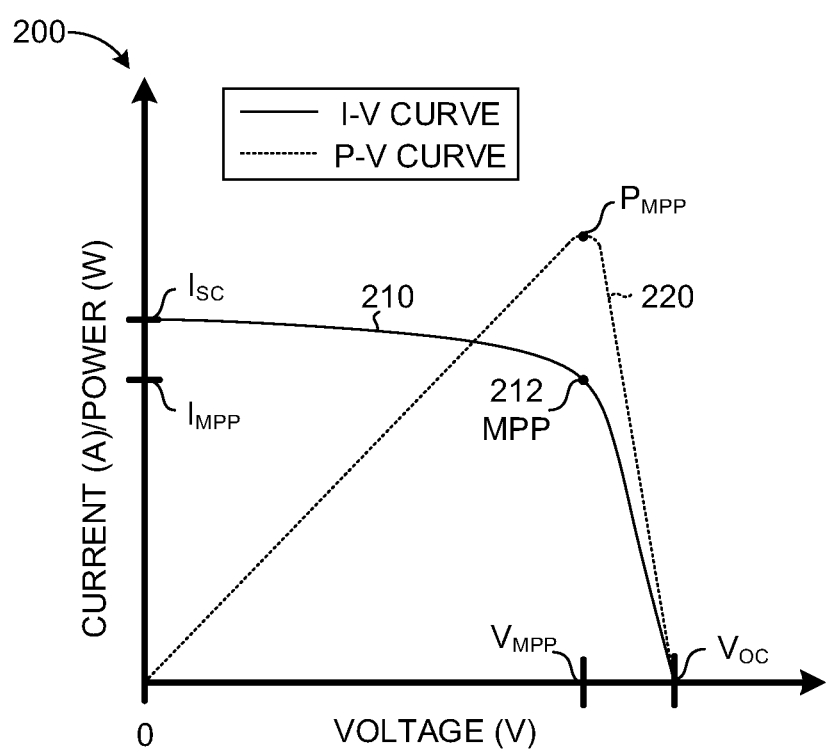
FIG. 3 illustrates a diagram for determining a maximum power point of a photovoltaic array.

FIG. 3 illustrates a chart 200 that demonstrates the MPPT procedure. The chart 200 includes a current-voltage (I-V) plot 210 that plots input current as a function effective output voltage. The plot 210 represents an example of a current, in amperes (A) provided to the inverter 116 at the input 119 as a function of the effective output voltage, in volts (V) of the PV array 115 of FIG. 2. Additionally, the chart 200 includes a power-voltage (P-V) plot 220 that represents an example of an output power, in Watts (W) plotted as a function of the effective output voltage (in V). The plot 220 represents an example of an output power by the inverter 116 as a function of the effective output voltage applied by the PV array 115 at the input 119 of the inverter 116.

As illustrated by the plot 210, the current decreases from a short circuit current, $I_{SC}$ to about 0 A as the effective output voltage of the PV array 115 increases from about 0 V (a short circuit) to an open circuit voltage, $V_{OC}$. Moreover, as illustrated by the plot 220, the output power increases from about 0 W to a Power maximum power point ($P_{MPP}$) as the effective output voltage increases from about 0 to a voltage maximum power point ($V_{MPP}$). Additionally, the output power decreases from the $P_{MPP}$ to about 0 W as the voltage increases from the $V_{MPP}$ to $V_{OC}$.

During the MPPT procedure, the effective output voltage of the PV array 115 is increased and decreased to determine an effect on the output power. In particular, the effective output voltage (e.g., the effective output voltage of the PV array 115) is increased and decreased until the $P_{MPP}$ and the $V_{MPP}$ are identified. Upon identification of the $V_{MPP}$, a current maximum power point, $I_{MPP}$ is also determined/identified, as indicated by the plot 210. A controller (e.g., the controller 124) sets the effective output voltage of the $V_{MPP}$, which induces a current at the $I_{MPP}$ and results in the MPP 212 on the I-V plot 210. As illustrated by the chart 200, the $P_{MPP}$ and the MPP are positioned on the same point of the voltage axis. Thus, setting the effective output voltage to the $V_{MPP}$, induces the $I_{MPP}$, which results in MPP and $P_{MPP}$.

Referring back to FIG. 2, the inverter 116 has a maximum inverter power that characterizes a maximum amount of power (corresponding to a maximum power rating and/or a contracting limit) the inverter 116 can deliver to the power grid 102. Similarly, the PV array 115 also has a maximum PV power. To ensure the PV array 115 saturates the inverter 116 at less than ideal conditions, the maximum PV power is greater than the maximum inverter power. In fact, in some examples, the maximum PV power is about 1.5 times (or more) than the maximum inverter power. Additionally, the controller 124 can set a selectable grid limit that defines a configurable maximum amount of power that the inverter 116 supplies to the power grid 102 at a given time. The selectable grid limit can change over time, for example, as the power needs on the power grid 102 change and/or changed as desired based on operational conditions of the power generation system 100 and/or the power grid 102. Further, the selectable grid limit can change based on financial considerations. In fact, as noted herein, the selectable grid limit can change for nearly any reason at nearly any time. The selectable grid limit could be set to a power level that is less than or equal to the maximum inverter power. For instance, in one example, the selectable grid limit may be 95% of the maximum inverter power.

In the first mode, the PV array 115 generates power that is provided to the power grid 102 via the inverter 116. During operation in the first mode, the controller 124 monitors the effective output voltage of the PV array 115, the current applied at the input 119 and/or the power output by the inverter 116 to determine a voltage at which the inverter 116 reaches the selectable grid limit. This voltage can be referred to as a selectable grid limit voltage, $V_{GL}(t)$. The selectable grid limit voltage, $V_{GL}(t)$ can change a function of the selectable grid limit. As one example, the power generation system 100 operates in the first mode from a time of sunrise and/or a time of (nearly) complete discharge of the DC energy storage source 122 until the inverter 116 reaches the selectable grid limit. Upon detecting that the inverter 116 has reached the selectable grid limit, similar to the power generation system 50 of FIG. 1, the controller 124 switches the power generation system 100 to a second mode.

In the second mode, the controller 124 monitors the DC energy storage data to determine an open circuit voltage of the DC energy storage source 122. The controller 124 sets the effective output voltage of the PV array 115 to substantially match the open circuit voltage of the DC energy storage source 122. Upon such matching, in the second mode, the controller 124 closes (or keeps closed) the first switch, S1 and the second switch S2. Thus, in the second mode, the PV array 115 and the DC energy storage source 122 are electrically coupled to the same electrical node, namely, the input 119 of the inverter 116. Additionally, the controller 124 determines a charging voltage, $V_{DC\_CH}$ of the DC energy storage source 122. The charging voltage may be predetermined and/or may be based on a measured output voltage, current and/or impedance of the DC energy storage source 122 characterized in the DC energy storage data.

In the second mode, the controller 124 commands the inverter 116 to (slowly and incrementally) increase the effective output voltage of the PV array 115 from the open circuit voltage of the DC energy storage source 122 to a level that corresponds to a power and charge voltage, $V_{PC}$. The power and charge voltage, $V_{PC}$ can be approximated by Equations 1 and 2.

$$V_{PC}(t) \approx V_{OC} + V_{DC\_CH}(t) \quad \text{Equation 1:}$$

$$V_{DC\_CH}(t) = I_D(t)R(t) \quad \text{Equation 2:}$$

Wherein:
 $V_{PC}(t)$ is the power and charge voltage as a function of time;
 $V_{OC}$ is the open circuit voltage of the DC energy storage source 122;
 $V_{DC\_CH}(t)$ is the charging voltage of the DC energy storage source 122;
 $I_D(t)$ is a desired charging current of the DC energy storage source 122 as a function of time; and
 R(t) is the input impedance of the DC energy storage source as a function of time.

The desired charging current, $I_D$, which changes as a function of time, is based on a charging current limit, $I_L$, of the DC energy storage source 122. The charging current limit can be a maximum safe charging current employable by the DC energy storage source 122. The desired charging current, $I_D$ can be set (by the controller 124) to a current that is less than or equal to the charging current limit, $I_L$ of the DC energy storage source 122. The desired charging current, $I_D$ can be less than the charging current limit, $I_L$ in examples where a specific charging rate of the DC energy storage source 122 is needed. Additionally, the desired charging current, $I_D$ might be set to a level less than the charging current limit, $I_L$ to improve a (battery) lifetime of the DC energy storage source 122. It is to be appreciated that there are many other reasons that the desired charging current, $I_D$ might be set to a level less than the charging current limit, $I_L$.

The power and charge voltage, $V_{PC}$ is a dynamic value that changes as the charging voltage, $V_{DC\_CH}(t)$ and/or the selectable grid limit changes over the time, t. In another given example (hereinafter, "the other example"), it is presumed that if the PV array 115 applies an effective output voltage of about 900 V to the input 119 of the inverter 116, that the inverter 116 reaches the selectable grid limit at a given time. Further, it is presumed that the DC energy storage source 122 has an open circuit voltage of about 850 V when the inverter 116 reaches the selectable grid limit. Additionally, in the other example, it is presumed that the charging voltage, $V_{DC\_CH}$ for the DC energy storage source 122 is 23 V at the given time. Thus, in the other example, the controller 124 initially sets the effective voltage of the PV array 115 to match the DC charging voltage of the DC energy storage source 122 (850 V in the other example) and then closes the second switch, S2. Additionally, the controller 124 gradually raises the effective voltage of the PV array 115 and measures a response current. Upon detecting that the desired current of the DC energy storage source 122 is reached, the controller 124 sets the effective output voltage of the PV array 124 to the power and charge voltage, $V_{PC}$, which is about 873 V in the other example. Moreover, the controller 124 employs closed loop feedback to adjust the power and charge voltage $V_{PC}$ over time as the charging voltage, $V_{DC\_CH}$ and/or the selectable grid limit changes over time.

In the second mode, upon setting the power and charge voltage, $V_{PC}(t)$, the PV array 115 supplies power to the power grid 102 (via the inverter 116) and charges the DC energy storage source 122 concurrently. That is, the PV array 115 charges the DC energy storage source 122 directly since the PV array 115 and the DC energy storage source 122 are coupled to a common node (the input 119 of the inverter 116). In the second mode, the DC energy storage source 122 "resists" the increase of voltage over the open circuit voltage $V_{OC}$, and absorbs excess voltage/current to charge the DC energy storage source 122. That is, since the inverter 116 has reached the selectable grid limit for power provided to the power grid 102, the inverter 116 does not absorb current from the PV array 115 greater than a current at the selectable grid limit voltage, $V_{GL}(t)$. This current is (instead) stored in the DC energy storage source 122, thereby charging the DC energy storage source 122 directly from the PV array 115.

Additionally, in the second mode, the controller 124 continues to update the power and charge voltage, $V_{GC}(t)$ in response to determining a change in the charging voltage, $V_{DC\_CH}(t)$ for the DC energy storage source 122 and/or the selectable grid limit voltage, $V_{GL}(t)$. In particular, in response to detecting an increase in the DC energy storage source 122 current, causing an increase of the charging voltage, $V_{DC\_CH}$ of the DC energy storage source 122 (indicating that the DC energy storage source 122 has increased the stored charge) for a particular time, the controller 124 increases the power and charge voltage, $V_{PC}$ at the particular time. Conversely, in response to detecting a decrease in the DC energy storage source current causing a decrease in the charging voltage, $V_{DC\_CH}$ (indicating that the DC energy storage source 122 is discharging) at a particular time, the controller 124 decreases the power and charge voltage, $V_{PC}$ at the particular time. In this manner, the controller 124 employs closed loop feedback to concurrently charge the DC energy storage source 122 and provide power to the power grid 102.

The controller 124 maintains the power generation system 100 in the second mode until (for example) the controller 124 receives a command to stop operations in the second mode or detects that the DC energy storage source 122 is fully charged. In some examples, the controller 124 may detect that an output voltage of the PV array 115 drops below a threshold level. Alternatively, the controller 124 may detect that the inverter 116 is unable to maintain an effective output voltage for the PV array 115 to charge the DC energy storage source 122 that is within a range allowable by the inverter 116 and/or the DC energy storage source 122. In any such situation, the controller 124 can switch the power generation system 100 to the first mode. Additionally or alternatively, the controller 124 can switch the power generation system 100 to the first mode in response to detecting a relative steep rate of decline in the output power of the inverter 116, which can indicate the presence of a weather element (e.g., a cloud). In the first mode, the controller 124 opens the second switch S2 to disconnect the DC energy storage source 122 from the input 119 of the inverter 116 and from further charging by the PV array 115. Moreover, if the controller 124 detects favorable conditions for charging the DC energy storage source 122 have been restored, the controller 124 switches the power generation system 100 back to the second mode. The process of switching between the first mode and the second mode may be repeated multiple times throughout daylight hours. For instance, the presence of temporary weather elements, such as, but not limited to, temperature changes, clouds, rain, etc. may result in a relatively steep drop in the output voltage of the PV array 115 that causes the inverter 116 to temporarily drop the output power. In turn, the controller 124 temporarily switches the power generation system 100 to the first mode.

Further, it is noted that in some examples, the controller 124 can lower the effective output voltage of the PV array 115 to a level below the open circuit voltage, $V_{OC}$, which causes the DC energy storage source 122 to discharge to "resist" the change in voltage. In this situation, the PV array 115 and the DC energy storage source 122 concurrently provide DC power to the inverter 116 that is converted into AC power for the grid 102.

Additionally, after the output power of the inverter 116 drops gradually (indicating a sunset), the controller 124 is configured to switch the power generation system 100 to a third mode similar to the third mode explained with respect to FIG. 1. Additionally or alternatively, the controller 124 may switch to the third mode based on a time of day. The controller 124 switches to the third mode, for example, near sunset. In the third mode, the controller 124 opens (or keeps open) the first switch S1 and closes (or keeps closed) the second switch S2. In the third mode, the DC energy storage source 122 supplies an input voltage to the input 119 of the inverter 116, and the inverter supplies AC power to the power grid 102. Accordingly, in the third mode, the DC energy storage source 122 discharges and supplies power to the power grid 102 via the inverter 116.

In the third mode, the controller 124 monitors the output voltage and current of the DC energy storage source 122 to determine if a minimum SOC of the DC energy storage source 122 is reached. In some examples, the minimum SOC is a level at which the DC energy storage source 122 has been nearly completely discharged (depleted). Upon reaching the minimum SOC, the controller 124 can switch the power generation system 100 to the first mode.

Figure 4:
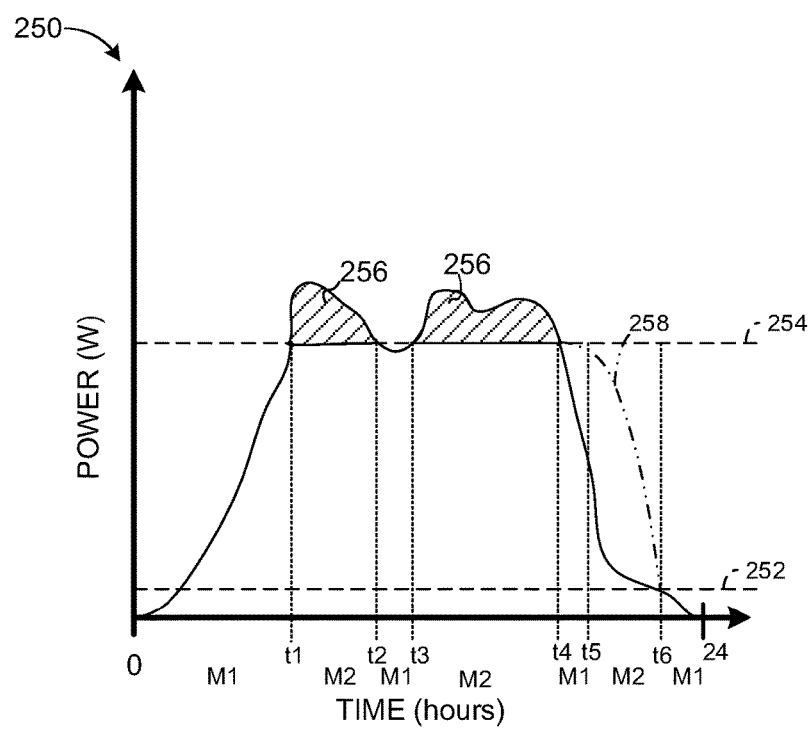
FIG. 4 illustrates a diagram of an output of an inverter plotted as a function of time.

FIG. 4 illustrates an example of a chart 250 that plots an output power in Watts (W) of the inverter 116 as a function of time, in hours, over the course of a full day (24 hours). Additionally, the chart 250 includes a minimum power level 252 (corresponding to a minimum SOC of DC energy storage source 122) and a selectable grid limit 254. For purposes of simplification of explanation, it is presumed that the selectable grid limit 254 is static, but as explained, the selectable grid limit (in some examples) could change as a function of time.

Additionally, the chart 250 denotes times that the power generation system 150 switches between the first mode ("M1" in FIG. 4), the second mode ("M2" in FIG. 4) and the third mode ("M3" in FIG. 4"). As demonstrated, in the example illustrated by the chart 250, between a time of about sunrise (time '0') until time t1, the power generation system 100 operates in the first mode, M1. Additionally, between times t1 and t2, the power generation system 100 operates in the second mode, M2. In the second mode, power exceeding the selectable grid limit 254 is employed to charge the DC energy storage source 122, which excess power is illustrated by shaded regions 256.

Further, between times t2 and t3, the output power temporarily drops (relatively steeply) below the selectable grid limit 254, and the power generation system 100 returns to the first mode, M1. Upon the output power being restored to the selectable grid limit 254, the power generation system 100 returns to the second mode, M2. Similarly, between times t4 and t5, the power generation system 100 switches to the first mode, M1. However, due to the time of day (e.g., near sunset), the output power gradually decreases between time t4 and t5, and the power generation system 100 switches to the third mode. In the third mode, DC energy storage source power denoted by a plot 258 is provided to the grid via the inverter 116. The power generation system then switches back to the first mode, M1 at time, t6 wherein the DC energy storage source 122 is depleted.

Referring back to FIG. 2, as an alternative, the controller 124 can be programmed to operate in the second mode to maximize a charging of the DC energy storage source 122. In particular, the controller 124 can (nearly) continuously adjust the selectable grid limit and the resultant power and charge voltage, $V_{PC}(t)$ to increase charging time. This approach may be desirable, for example, in situations where the power needs of the power grid 102 and/or financial credit for providing power to the power grid 102 change over time. Accordingly, in such a situation, the DC energy storage source 122 can be charged at times where demand and/or financial credit for power at the power grid 102 is low and stored for later delivery with a higher demand and/or higher financial credit.

Figure 5:
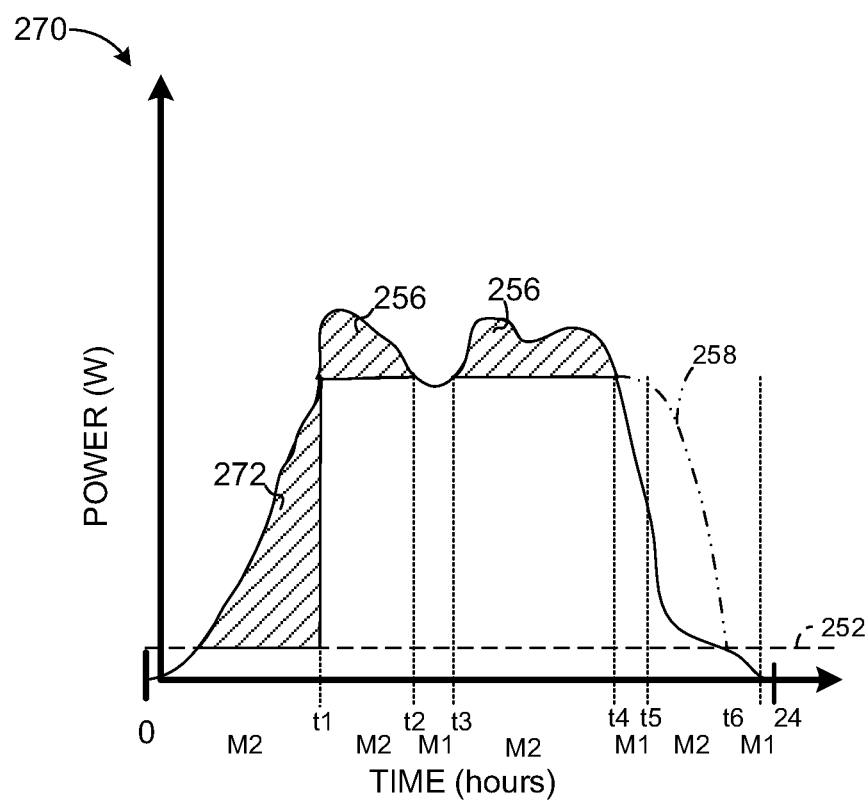
FIG. 5 illustrates another diagram of an output of an inverter plotted as a function of time.

FIG. 5 illustrates a graph 270 wherein DC energy storage source charging time is increased relative to the chart 250 illustrated in FIG. 4. For purposes of simplification of explanation, FIGS. 4 and 5 employ the same reference numbers to denote the same structure. Throughout the time illustrated in the graph 270 (24 hours), the selectable grid limit and corresponding power and charge voltage $V_{PC}(t)$ change as a function of time. In the graph 270, between time 0 and time t1, the power generation system 100 operates in the second mode, adding an additional region 272 of excess power that is employed to charge the DC energy storage source 122. To add the additional region 272, the selectable grid limit can be dynamically lowered to a level slightly below the MPP of the PV array 15 to a level corresponding to the power and charge voltage, $V_{PC}$.

Referring back to FIG. 2, by employing the power generation system 100, the PV array 115 can directly charge the DC energy storage source 122 while concurrently supplying power to the power grid 102. This direct charge of the DC energy storage source 122 obviates the need for a separate inverter and/or DC-DC converter for the DC energy storage source 122. Instead, as explained, in the second mode, the effective output voltage of the PV array 115 is controlled by the controller 124 at the input 119 of the inverter 116 to prevent an application of an excessively large voltage that might damage or reduce the lifetime of the DC energy storage source 122. In this manner, at times of the day that the PV array 115 is capable of providing more power to the power grid 102 than the selectable grid limit allows, the excess power can be employed to charge the DC energy storage source 122.

Figure 6:
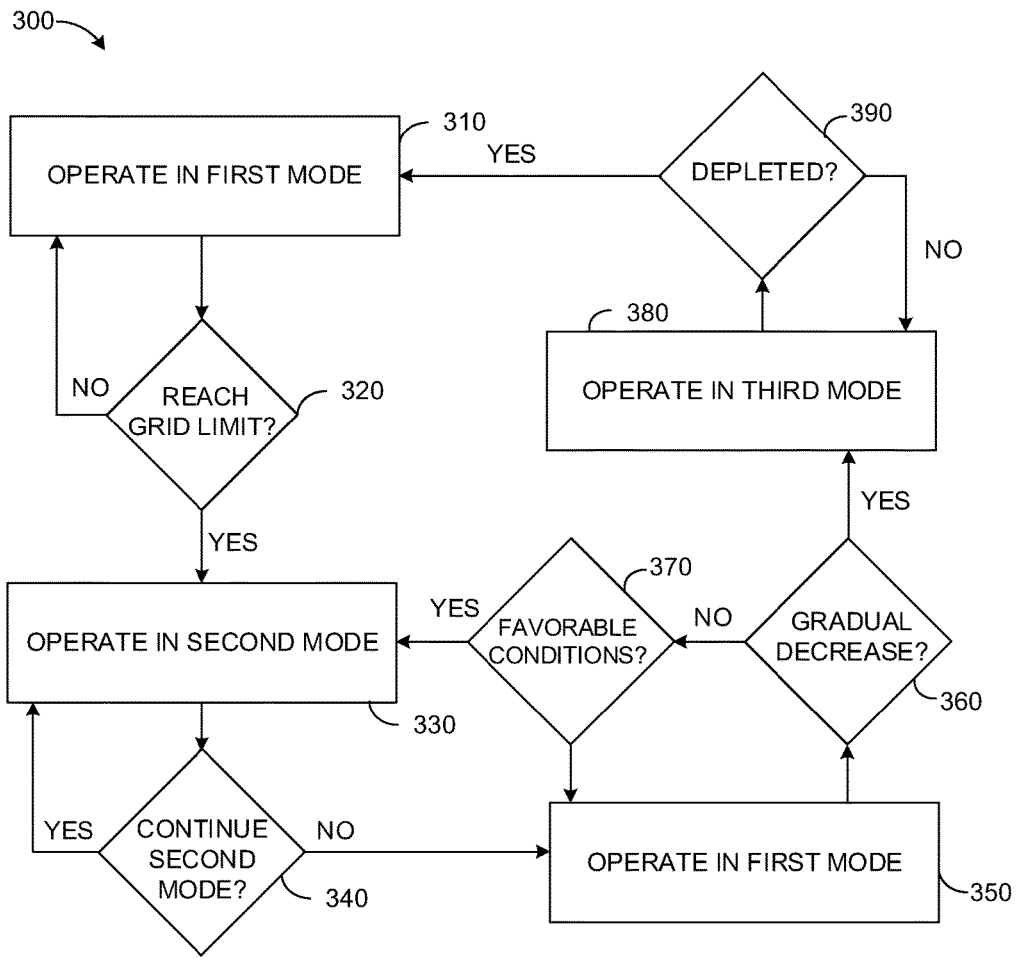
FIG. 6 illustrates a flowchart of an example method for controlling a power generation system.
Figure 7:
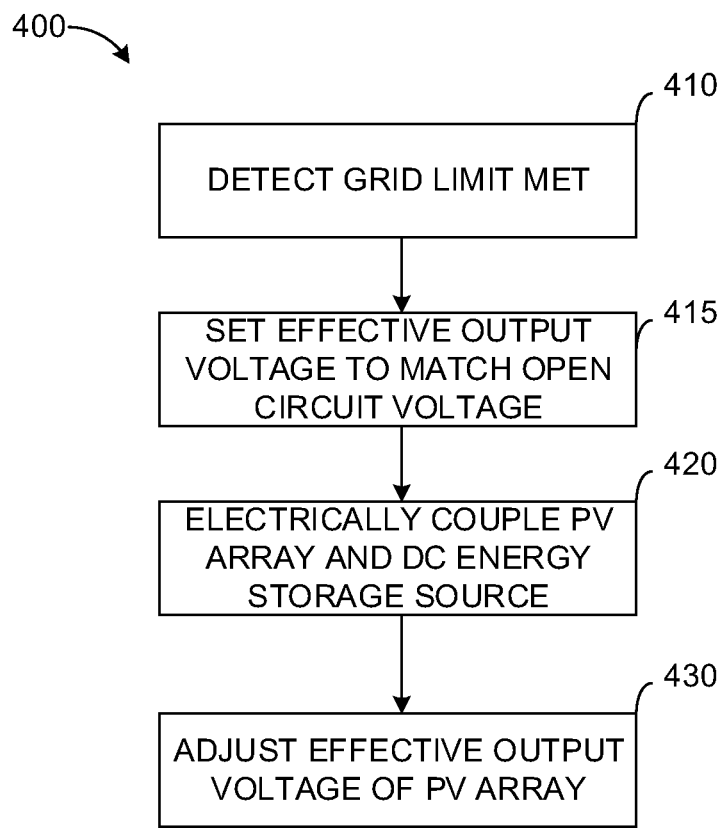
FIG. 7 illustrates another flowchart of an example method for controlling a power generation system.

In view of the foregoing structural and functional features described above, example methods will be better appreciated with reference to FIGS. 6 and 7. While, for purposes of simplicity of explanation, the example methods of FIGS. 6 and 7 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 6 and 7 can be implemented as instructions stored in a non-transitory machine-readable medium. The instructions can be accessed by a processing resource (e.g., one or more processor cores) and executed to perform the methods disclosed herein.

FIG. 6 illustrates a flowchart of an example method 300 for controlling a power generation system that provides power to a power grid, such as the power generation system 50 of FIG. 1 and/or the power generation system 100 of FIG. 2. The method 300 could be implemented, for example by a controller, such as the controller 66 of FIG. 1 and/or the controller 124 of FIG. 2.

At 310, the controller operates the power generation system in a first mode. As described herein, in the first mode, the controller closes a first switch S1 (illustrated in FIGS. 1 and 2) to electrically couple a PV array (e.g., the PV array 54 of FIG. 1) to an input of an inverter (e.g., the inverter 55 of FIG. 1) and opens a second switch S2 (illustrated in FIGS. 1 and 2) that decouples a DC energy storage source (e.g., the DC energy storage source 60 of FIG. 1) from the input of the inverter. Additionally, in the first mode, the controller executes an MPPT procedure to determine the MPP for the PV array. At 320, a determination is made as to whether a selectable grid limit has been reached. If the determination at 320 is positive (e.g., YES), the method 300 proceeds to 330. If the determination at 320 is negative (e.g., NO), the method 300 returns to 310.

At 330, the controller operates the power generation system in a second mode. In the second mode, the controller sets a voltage of the PV array to an open circuit voltage of the DC energy storage source and then the controller closes (or keeps closed) the first switch S1 and closes the second switch. In the second mode, the DC energy storage source and the PV array are electrically coupled to the input of the inverter. Moreover, the controller adjusts a power and charge voltage (e.g., $V_{PC}(t)$ of Equation 1) to provide power to the grid and charge the DC energy storage source concurrently. At 340, a determination is made as to whether the power generation system should continue to operate in the second mode based on operating conditions of the power generation system or other conditions (as explained herein). If the determination at 340 is positive (e.g., YES), the method 300 returns to 330. If the determination at 340 is negative (e.g., NO), the method proceeds to 350.

At 350, the controller operates the power generation system in the first mode and can re-execute the MPPT procedure. At 360, a determination is made as to whether a gradual decrease in output power of the inverter (e.g., indicating a sunset) is detected. If the determination at 360 is negative (e.g., NO), the method proceeds to 370. If the determination at 360 is positive (e.g., YES), the method proceeds to 380.

At 370, a determination is made as to whether favorable conditions for charging the DC energy power source have been restored. If the determination at 370 is negative (e.g., NO), the method 300 returns to 350. If the determination at 370 is positive (e.g., YES), the method 300 returns to 330.

At 380, the controller operates the power generation system in a third mode. In the third mode, the controller opens the first switch S1 and closes the second switch S2. Thus, in the third mode, the DC energy storage source is coupled to the input of the inverter, and the PV array is decoupled (disconnected) from the input of the inverter. In this manner, the DC energy storage source provides power to the grid via the inverter. At 390 a determination is made as to whether the DC energy storage source has been depleted (nearly completely discharged). If the determination at 390 is negative (e.g., NO), the method 300 returns to 380. If the determination at 300 is positive (e.g., YES), the method returns to 310.

FIG. 7 illustrates a flowchart of an example method 400 for operating a power generation system in the second mode to concurrently charge a DC energy storage source and provide output power on a power grid (e.g., the power grid 52 of FIG. 1). The method 400 can be implemented, for example, by a controller (e.g., the controller 66 of FIG. 1 and/or the controller 124 of FIG. 2). At 410, the controller detects that an output of an inverter (e.g., the inverter 55 of FIG. 1) coupled to a PV array (e.g., the PV array 54 of FIG. 1) reaches a selectable grid limit. At 415, the controller sets an effective voltage of the PV array to substantially match an open circuit voltage of a DC energy storage source (e.g., the DC energy storage source 60 of FIG. 1). At 420, the controller electrically couples the PV array to the DC energy storage source. At 430, the controller adjusts an effective output voltage of the PV array based on a charging voltage of the DC energy storage source thereby concurrently charging the DC energy storage source and providing power to the power grid. In this manner, over charging of the DC energy storage source is prevented.

In view of the foregoing structural and functional description, those skilled in the art will appreciate that portions of the systems and methods disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A controller of a power generation system that:
controls coupling of a photovoltaic (PV) array to an inverter coupled to a power grid;
monitors an output voltage of a direct current (DC) energy storage source disconnectedly coupled to the inverter;
monitors an output power of the inverter;
couples the PV array to the DC energy storage source; and
adjusts an effective output voltage of the PV array based on the output voltage of the DC energy storage source to control an amount of charge of the DC energy storage source.

2. The controller of claim 1, wherein the controller commands the inverter to adjust an impedance of the inverter to change the effective output voltage of the PV array.

3. The controller of claim 1, wherein the effective output voltage is set to a level of about a voltage corresponding to an open circuit voltage of the DC energy storage source plus a charging voltage of the DC energy storage source.

4. The controller of claim 1, wherein the DC energy storage source is charged by the PV array and the PV array provides power to the inverter concurrently.

5. The controller of claim 1, wherein the DC energy storage source comprises a bank of battery cells.

6. The controller of claim 5, wherein each battery cell is a lithium-ion battery cell.

7. The controller of claim 1, wherein the controller adjusts the effective output voltage of the PV array in response to an increase in the current of the DC energy storage source.

8. The controller of claim 1, wherein the controller decreases the effective output voltage of the PV array in response to a decrease in the current of the DC energy storage source.

9. The controller of claim 1, wherein the controller disconnects the PV array from the inverter in response to detecting that the DC energy storage source is nearly fully charged.

10. The controller of claim 1, wherein the selectable grid limit is a dynamic value that changes over the course of a day.

11. The controller of claim 1, wherein the controller couples the PV array to the DC energy storage source in response to determining that the output power of the inverter meets a selectable grid limit that is less than or equal to a maximum output power of the inverter.

12. The controller of claim 11, wherein the PV array has a maximum output power that is greater than the maximum output power of the inverter.

13. The controller of claim 1, wherein the selectable grid limit changes over time based on a changing status to at least one of environmental conditions, a financial credit for power applied to the grid and user input.

14. The controller of claim 1, wherein the controller reduces the effective output voltage of the PV array to a level below an open circuit voltage of the DC energy storage source to discharge the DC energy storage source.

15. A power generation system comprising:
an inverter coupled to a power grid;
a photovoltaic (PV) array disconnectedly coupled to the inverter;

a DC energy storage source disconnectedly coupled to the inverter and the PV array; and a controller that connects the PV array to the DC energy storage source in response to determining that an output power of the inverter meets a selectable grid limit that changes over time and the controller adjusts an effective output voltage of the PV array based on an open circuit voltage and a charging voltage of the DC energy storage source to charge the DC energy storage source.

16. The power generation system of claim 15, wherein the controller disconnects the DC energy storage source from the inverter and the PV array in response to detecting that an effective voltage of the PV array for charging the DC energy storage source is outside an allowable range of at least one of the inverter and the DC energy storage source.

17. The power generation system of claim 15, wherein the controller executes a maximum power transfer point tracking procedure to determine the effective output voltage of the PV array.

18. The power generation system of claim 15, wherein the selectable grid limit is less than or equal to a maximum power rating of the inverter and the selectable grid limit changes based on at least one of a time of day, power needs of the power grid and user input to the controller.

19. A method comprising:

detecting that an output of an inverter meets a selectable grid limit, wherein a photovoltaic (PV) array provides power to the inverter;

setting an effective output voltage of the PV array to match an open circuit voltage of a DC energy storage source;

electrically coupling, in response to the setting, the PV array to a DC energy storage source; and adjusting the effective output voltage of the PV array based on the open circuit voltage and a charging voltage of the DC energy storage source to charge the DC energy storage source and provide power to a power grid concurrently.

20. The method of claim 19, wherein the adjusting prevents an over charging of the DC energy storage source.

* * * * *